(12) United States Patent
Tanabe et al.

(10) Patent No.: US 10,494,029 B2
(45) Date of Patent: Dec. 3, 2019

(54) VEHICLE FRONT STRUCTURE

(71) Applicant: Suzuki Motor Corporation, Hamamatsu-shi, Shizuoka (JP)

(72) Inventors: Yoshihiro Tanabe, Shizuoka-Ken (JP); Akihiro Hadano, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 15/952,775

(22) Filed: Apr. 13, 2018

(65) Prior Publication Data

US 2018/0304930 A1    Oct. 25, 2018

(30) Foreign Application Priority Data

Apr. 19, 2017    (JP) ................. 2017-082970

(51) Int. Cl.
| | |
|---|---|
| *B62D 21/15* | (2006.01) |
| *B62D 21/02* | (2006.01) |
| *B60R 19/02* | (2006.01) |
| *B60R 19/24* | (2006.01) |

(52) U.S. Cl.
CPC .......... *B62D 21/152* (2013.01); *B60R 19/023* (2013.01); *B60R 19/24* (2013.01); *B62D 21/02* (2013.01); *B60R 2019/247* (2013.01)

(58) Field of Classification Search
CPC .. B62D 21/152; B62D 25/085; B62D 25/084; B60R 19/24; B60R 19/023
USPC ............................. 296/187.1, 193.09, 203.02
See application file for complete search history.

(56) References Cited

U.S. PATENT DOCUMENTS

| | | | | |
|---|---|---|---|---|
| 2014/0159430 | A1* | 6/2014 | Mildner | B62D 25/04 296/193.09 |
| 2015/0076862 | A1* | 3/2015 | Abe | B62D 21/152 296/187.1 |
| 2015/0115633 | A1* | 4/2015 | Braunbeck | B60R 19/04 293/132 |
| 2015/0115653 | A1* | 4/2015 | Ookubo | B62D 21/152 296/187.1 |
| 2016/0039374 | A1* | 2/2016 | Sugano | B60R 19/04 293/133 |
| 2018/0361965 | A1* | 12/2018 | Hadano | B60R 19/18 |
| 2019/0071130 | A1* | 3/2019 | Ginja | B62D 25/08 |

\* cited by examiner

*Primary Examiner* — Jason S Morrow
(74) *Attorney, Agent, or Firm* — Lerner, David, Littenberg, Krumholz & Mentlik, LLP

(57) ABSTRACT

A vehicle front structure may include a side member, a bumper member arranged linearly at a vehicle frontmost end, a vehicle rear side of the bumper member being joined to the side member, and a front side member extension attached to a tip end part of the side member. A portion projecting outward and obliquely extending toward the vehicle rear from a curving point on the outer side is provided on both ends of the bumper member, a protrusion extending toward the side member is arranged on the inner side of the projecting portion, a planar portion opposite to a side face part on the vehicle outer side of the side member is provided on a tip end part on the vehicle inner side of the protrusion, and the planar portion and the side member extension are arranged so as to overlap each other in the vehicle longitudinal direction.

7 Claims, 5 Drawing Sheets

VEHICLE FRONT STRUCTURE

CROSS-REFERENCE TO RELATED APPLICATIONS

This application claims the benefit of the filing date of Japanese Patent Application No. 2017-082970 filed on Apr. 19, 2017, the disclosure of which is hereby incorporated herein by reference.

BACKGROUND OF THE INVENTION

Technical Field

The present invention relates to a vehicle front structure.

Background Art

In a conventional vehicle front structure, a bumper member joined to front end parts of side members is arranged in the vehicle width direction, and extension parts extending outward in the vehicle width direction are provided on both ends in the vehicle width direction of the bumper member. Some vehicles including this type of vehicle front structure are configured such that, in a crash mode in which an impact load of a frontal crash is applied only to the extension parts of the bumper member, the impact load is transmitted to the side members through the extension parts.

For example, in a vehicle front structure of JP 2016-078492 A, a frontwardly protruding frontward protrusion, and a rearward protrusion that comes into contact with a front side member at the time of a small overlap crash, are provided in an extension part of a bumper reinforcement, which is on the outer side of a support position of the front side member. Hence, an input impact load is absorbed by being transmitted to the front side member through the protrusion.

BRIEF SUMMARY OF THE INVENTION

Problems to be Solved by the Invention

However, in the above-mentioned conventional vehicle front structure, the rearward protrusion has a triangular cross section including an inner tip end part, and is arranged in such a manner as to protrude toward the vehicle rear. Accordingly, at the time of an offset crash in which the impact load is applied only to the extension part, the extension part is pushed in toward the vehicle rear and deforms and therefore may be unable to transmit the impact load to the front side member. Moreover, in the conventional vehicle front structure, a weak part needs to be provided in a vehicle front part of the front side member, and at the time of a crash, the weak part of the front side member needs to be pushed and deformed by the inner tip end part of the rearward protrusion to absorb the load of the crash. Hence, the structure becomes complex and may increase costs.

The present invention has been made in view of the foregoing and aims to provide a vehicle front structure that, at the time of an offset crash on a bumper member, suppresses deformation of the bumper member by bringing a protrusion into contact with a side face of a side member along with deformation of the bumper member, and prevents excessive deformation of the side member toward the vehicle inner side by reinforcing the side member with a front side member extension, so that the protrusion is allowed to fully exert its function, and the ability of reducing crash damage can be enhanced.

Means for Solving the Problems

To solve the above problems of the conventional technique, the present invention is a vehicle front structure including: a side member extending in a vehicle longitudinal direction, and arranged on both sides of a vehicle; a bumper member extending in a vehicle width direction and arranged linearly at a vehicle frontmost end, a vehicle rear side of the bumper member being joined to the side member; and a front side member extension extending in a vehicle vertical direction, and attached to a tip end part of the side member, the bumper member having a curving point on the outer side in the vehicle width direction, and a projecting portion projecting outward in the vehicle width direction and obliquely extending toward the vehicle rear from the curving point being provided on both ends in the vehicle width direction of the bumper member, in which: a protrusion extending toward the side member is arranged on an inner side in the vehicle width direction of the projecting portion, a planar portion opposite to a side face part on the vehicle outer side of the side member being provided on a tip end part on the vehicle inner side of the protrusion; and the planar portion of the protrusion and the front side member extension are arranged in such a manner as to overlap each other in the vehicle longitudinal direction.

Advantageous Effects of Invention

As described above, the vehicle front structure of the present invention includes: a side member extending in a vehicle longitudinal direction, and arranged on both sides of a vehicle; a bumper member extending in a vehicle width direction and arranged linearly at a vehicle frontmost end, a vehicle rear side of the bumper member being joined to the side member; and a front side member extension extending in a vehicle vertical direction, and attached to a tip end part of the side member, the bumper member having a curving point on the outer side in the vehicle width direction, and a projecting portion projecting outward in the vehicle width direction and obliquely extending toward the vehicle rear from the curving point being provided on both ends in the vehicle width direction of the bumper member. A protrusion extending toward the side member is arranged on the inner side in the vehicle width direction of the projecting portion, a planar portion opposite to a side face part on the vehicle outer side of the side member being provided on a tip end part on the vehicle inner side of the protrusion; and the planar portion of the protrusion and the front side member extension are arranged in such a manner as to overlap in the vehicle longitudinal direction.

Accordingly, in the vehicle front structure of the present invention, at the time of an offset crash which is a mode in which an end part on one side of the vehicle front part crashes, and the projecting portion of the bumper member on the crashed side bends toward the vehicle rear, the planar portion of the protrusion comes into contact with the side face part on the vehicle outer side of the side member along with deformation of the bumper member. Hence, the protrusion is interposed between the projecting portion of the bumper member and the side face part of the side member as a support, and can suppress deformation of the bumper member. Also, by suppressing deformation of the bumper member, deformation of the side member toward the vehicle compartment can be prevented, and damage can be reduced. Moreover, in the vehicle front structure of the present invention, the front side member extension is provided in the side member so as to correspond to the planar portion of the protrusion, whereby the side member is reinforced by the front side member extension. Hence, when the protrusion comes into contact with the side member, excessive deformation of the side member toward the vehicle inner side can be prevented, and since the protrusion is allowed to fully exert its function, the ability of reducing crash damage can be enhanced.

DETAILED DESCRIPTION

Mode for Carrying Out the Invention

Figure 1:
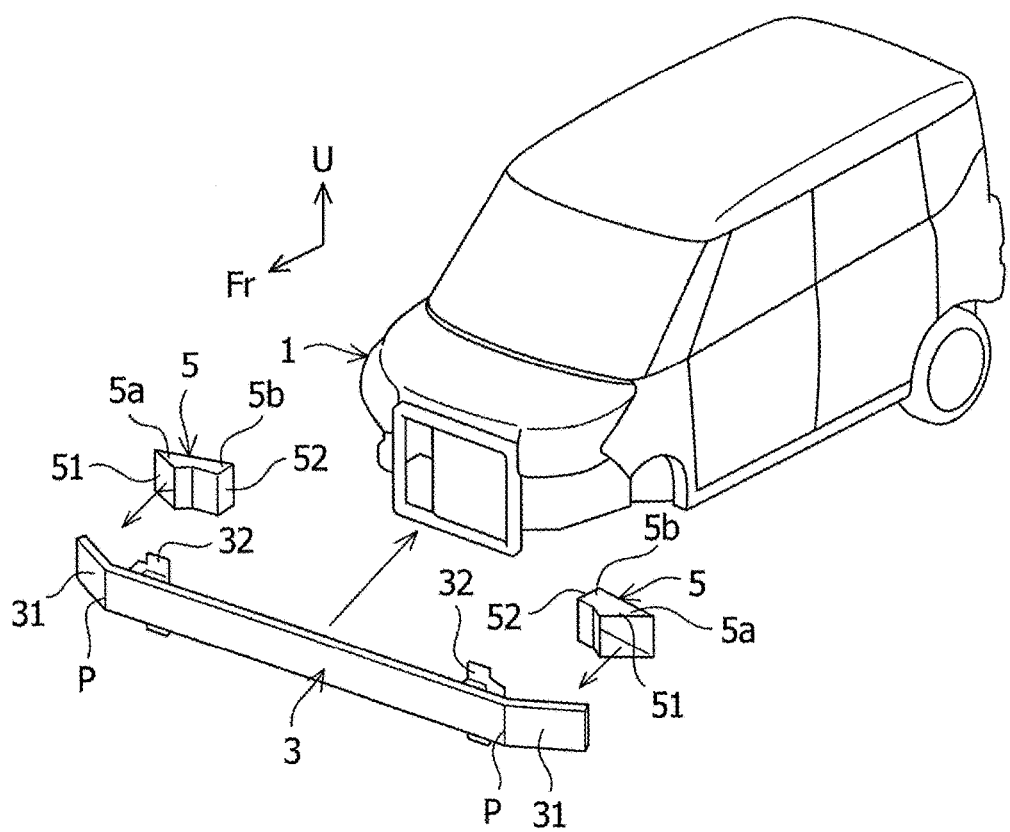
FIG. 1 is a perspective view of a vehicle front part to which a structure of an embodiment of the present invention is applied, before a bumper member is attached thereto, as viewed from an obliquely upper direction on the vehicle front side.

Hereinafter, the present invention will be described in detail based on an embodiment illustrated in the drawings.

FIGS. 1 to 5 illustrate a vehicle front structure of the embodiment of the present invention. Note that in the drawings, arrow Fr indicates the vehicle front, arrow O indicates the outer side of the vehicle, and arrow U indicates the upper direction of the vehicle. Also, arrow X indicates the vehicle width direction, and arrow Y indicates the vehicle longitudinal direction.

As illustrated in FIGS. 1 to 5, a vehicle front part 1 to which a structure of the embodiment of the present invention is applied mainly has: side members (front side members) 2 that extend in the vehicle longitudinal direction, and are respectively arranged on both side parts of the vehicle; a bumper member 3 that extends in the vehicle width direction, is linearly arranged at a vehicle frontmost end, a vehicle rear side of the bumper member 3 being joined to the side members 2; and front side member extensions 4 that extend in the vehicle vertical direction, and are attached to tip end parts of the side members 2. A joining portion 21 with the bumper member 3 is provided on a front end part of each of the side members 2, and joining portions 32 with the side members 2 are provided in parts of the bumper member 3 on outer sides of a middle part on the vehicle rear side of the bumper member. In other words, the side member 2 and the bumper member 3 are joined at both right and left joining portions 21, 32.

The bumper member 3 of the embodiment includes: a middle part in the vehicle width direction having a linear structure; and curving points (bending points) P on outer sides in the vehicle width direction of the middle part. Moreover, a projecting portion 31 projecting outward in the vehicle width direction, and extending over a predetermined length while being tilted at a predetermined sweepback angle □ (e.g., 30□) from the curving point P toward the vehicle rear, is provided on both ends in the vehicle width direction of the bumper member 3. The curving point P is positioned on the vehicle outer side of the joining portion 32 with the side member 2, at about the same distance as the longitudinal width of the bumper member 3.

Figure 2:
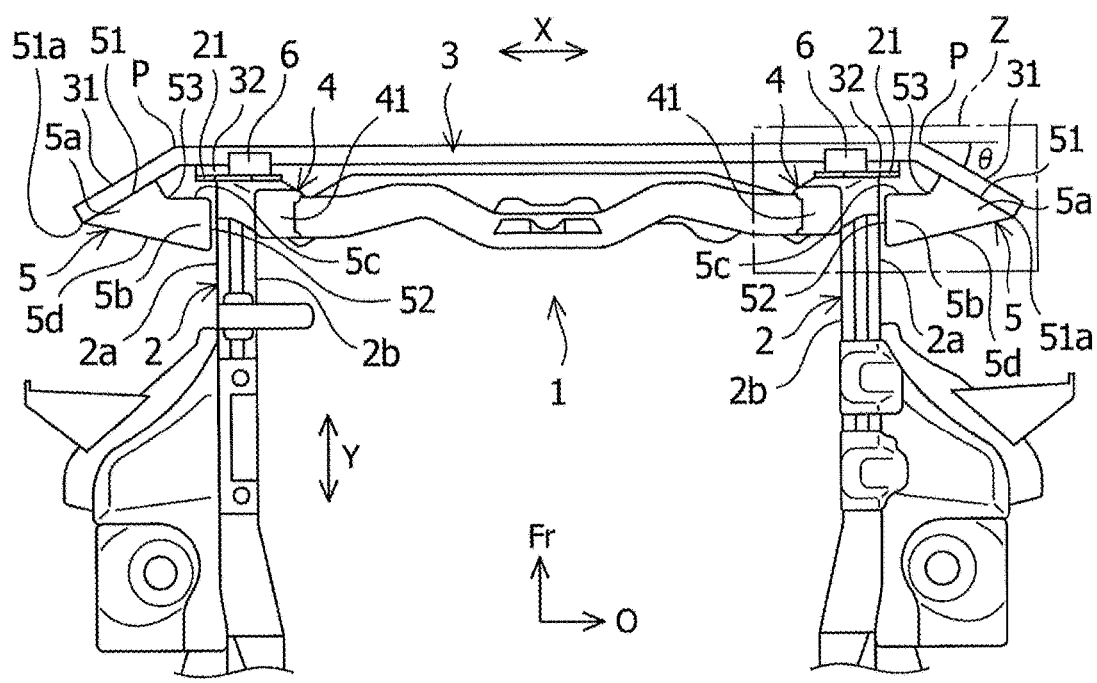
FIG. 2 is a plan view of the vehicle front part of FIG. 1 with the bumper member attached thereto, as viewed from the upper direction of the vehicle.
Figure 3:
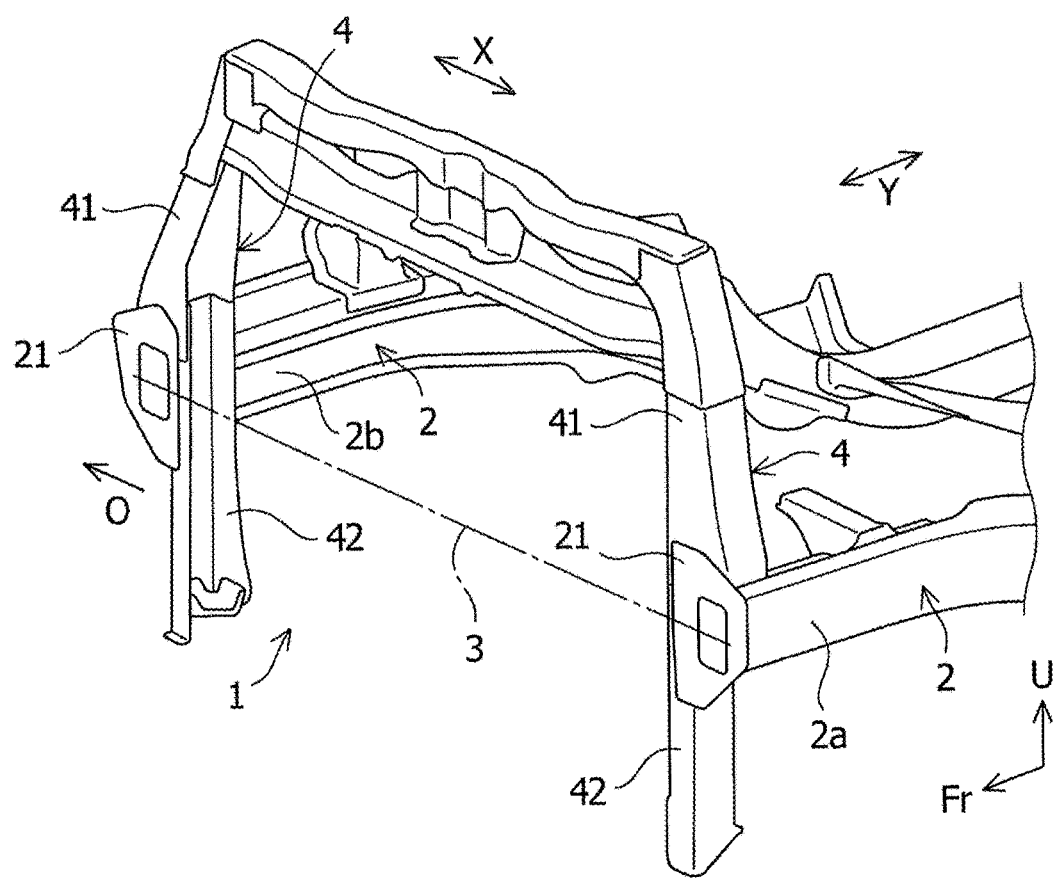
FIG. 3 is a perspective view of side members and front side member extensions of the vehicle front part of FIG. 1, as viewed from an obliquely upper direction on the vehicle front side.
Figure 4:
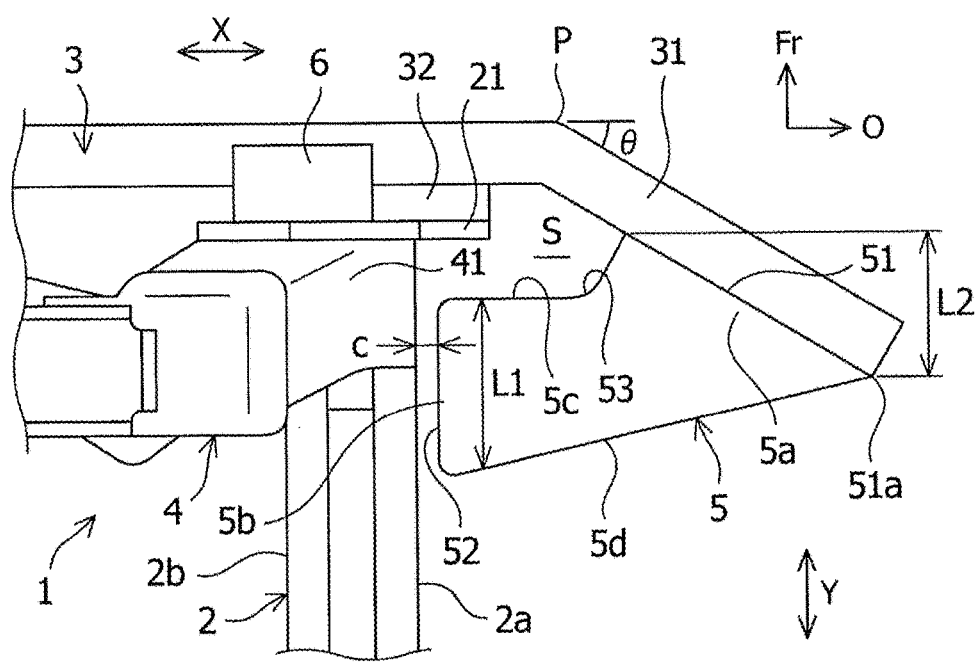
FIG. 4 is an enlarged plan view of part Z of FIG. 2.

As illustrated in FIGS. 1, 2, and 4, protrusions 5 respectively extending toward the side members 2 on both right and left sides are arranged on the inner side in the vehicle width direction of the projecting portions 31 in the bumper member 3 of the embodiment, and each protrusion 5 is formed into a substantially rectangular box structure in plan view.

The protrusion 5 also has: an arrangement portion 51 of which base end part 5a side is arranged by being attached to an inner wall face of the projecting portion 31 of the bumper member 3; and a planar portion 52 whose tip end part 5b side is arranged close to a side face part 2a on the vehicle outer side of the side member 2, and is opposite and parallel to the side face part 2a. The planar portion 52 of the protrusion 5 and the front side member extension 4 are arranged in such a manner as to overlap in the vehicle longitudinal direction. Moreover, normally, the planar portion 52 of the protrusion 5 is not in contact with the side face part 2a on the vehicle outer side of the side member 2, and a gap c is formed between the planar portion 52 and the side face part 2a. The gap c is provided to keep the protrusion 5 from hindering deformation of the side member 2, when the entire bumper member 3 is pushed in toward the vehicle rear, at the time of a full face crash (a full overlap crash) of the vehicle front part 1. This is because at the time of a full face crash of the vehicle front part 1, the projecting portions 31 on both end parts of the bumper member 3 do not bend toward the vehicle rear, and therefore the protrusions 5 do not come into contact with the side face parts 2a on the vehicle outer side of the side members 2.

As illustrated in FIGS. 2 and 4, in the protrusion 5 of the embodiment, a rear end part 51a of the arrangement portion 51 on the projecting portion 31 is formed into a shape that overlaps with the planar portion 52 of the protrusion 5. The rear end part 51a of the arrangement portion 51 is arranged so as to fall within an area in a vehicle longitudinal direction of the planar portion 52 in side view of the vehicle. What is more, the protrusion 5 is formed such that a longitudinal length L1 of the planar portion 52 on the inner side of the vehicle is greater than a longitudinal length L2 of the arrangement portion 51 on the outer side of the vehicle (L1>L2). With this arrangement, at the time of an offset crash when the projecting portions 31 on end parts of the bumper member 3 receive a load in a bending manner, and the load is applied in a vehicle inner horizontal direction, the planar portion 52 of the protrusion 5 receives the horizontal load to prevent deformation of the projecting portion 31 and other parts.

Also, as illustrated in FIGS. 2 and 4, an inner face 5c on the vehicle front side of the protrusion 5 has a curved portion 53 curving toward the vehicle rear, and the curved portion 53 curves gently from the arrangement portion 51 on the vehicle outer side to the planar portion 52 on the vehicle inner side. By providing the curved portion 53, the area of the planar portion 52 positioned on the tip end part 5b side of the protrusion 5 can be widened. Hence, even if the protrusion 5 is designed compactly, a sufficient contact area of the planar portion 52 on the side face part 2a on the vehicle outer side of the side member 2 can be ensured.

Moreover, an outer face 5d on the vehicle rear side of the protrusion 5 is formed into a linear plane tilted to the vehicle rear side, from the rear end part 51a of the arrangement portion 51 on the projecting portion 31 of the bumper member 3 toward the planar portion 52 of the protrusion 5. By forming the outer face 5d on the vehicle rear side of the protrusion 5 in such a shape, the strength of the protrusion 5 against load from an oblique front direction by an offset crash can be increased, and deformation of the projecting portion 31 of the bumper member 3 by the protrusion 5 is suppressed.

Meanwhile, as illustrated in FIG. 4, a space S for avoiding interference between the protrusion 5 and peripheral parts at the time of a crash is provided between the vehicle inner part of the protrusion 5 and the linear middle part of the bumper member 3, and between the vehicle front side of the protrusion 5 and the vehicle rear side of the curving point P. Accordingly, an impact load from the projecting portion 31 of the bumper member 3 is transmitted to the side member 2 through the protrusion 5 without being hindered, since interference between the protrusion 5 and peripheral parts is prevented by the space S. The gap between the vehicle inner part of the protrusion 5 and the linear middle part of the bumper member 3 is set to ⅓ of the longitudinal length of the bumper member 3.

In the vehicle front part 1 of the embodiment, the planar portion 52 of the protrusion 5 and the front side member extension 4 are arranged in such a manner as to overlap in the vehicle longitudinal direction, as illustrated in FIG. 4.

For this reason, the side member 2 positioned opposite to the planar portion 52 of the tip end part 5b of the protrusion 5 is reinforced by the front side member extension 4. This suppresses excessive deformation of the side member 2 to the vehicle inner side, at the time of an offset crash in which the planar portion 52 of the protrusion 5 comes into contact with the side face part 2a of the side member 2.

Additionally, as illustrated in FIGS. 2 to 5, the front side member extension 4 has an upper extension 41 extending in the vehicle upper direction on the vehicle upper side, and a lower extension 42 extending in the vehicle lower direction on the vehicle lower side. The upper extension 41 and the lower extension 42 are formed so as to have a substantially U-shaped cross section of which the opening is directed toward the vehicle inner side, and are joined such that an upper end part of the lower extension 42 is arranged inside a lower end part of the upper extension 41. Moreover, the upper extension 41 is arranged and joined to a tip end upper face of the side member 2, and an outer face of the lower extension 42 (front side member extension 4) and a side face part 2b on the vehicle inner side of the side member 2 are in contact with each other. In other words, the lower extension 42 of the front side member extension 4 is arranged in the part on the vehicle inner side of the side member 2 on which the planar portion 52 of the protrusion 5 abuts. Hence, the side member 2 is less likely to be deformed by a crash, and bending of the bumper member 3 is suppressed.

Figure 5:
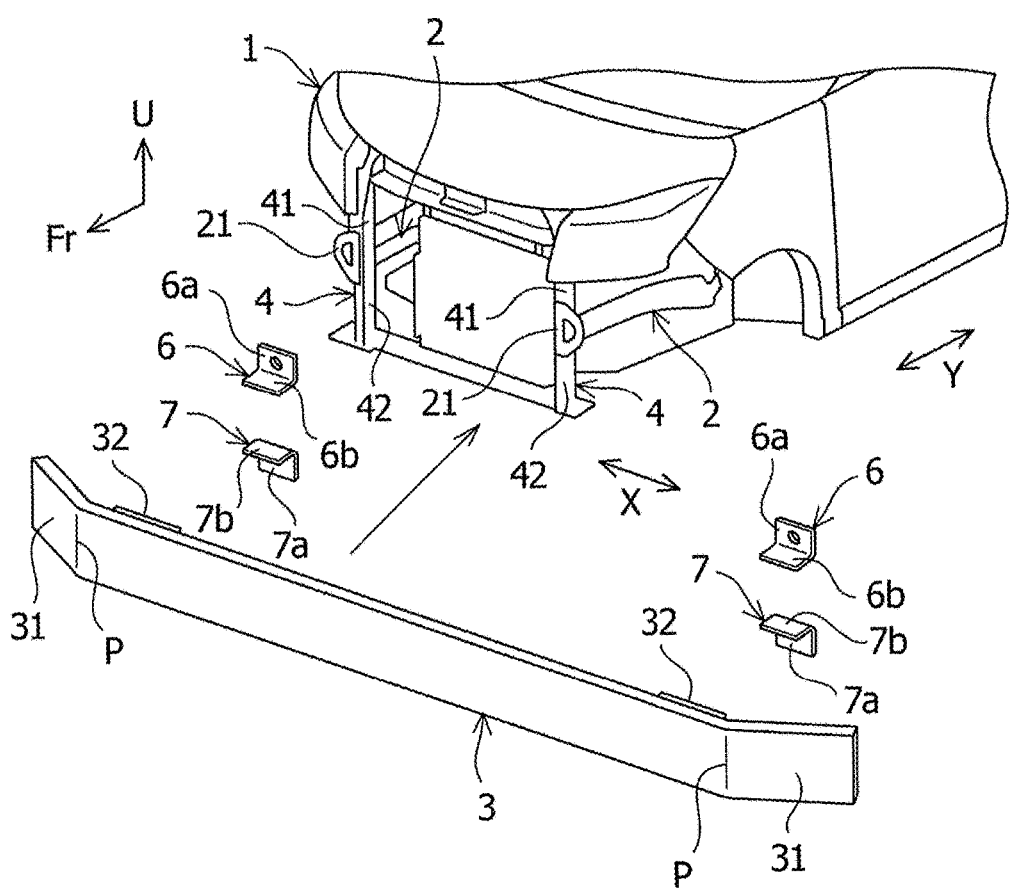
FIG. 5 is a perspective view of upper and lower pairs of attachment brackets for attaching the bumper member of FIG. 1 to the front side member extensions.

Additionally, as illustrated in FIGS. 2, 4, and 5, the upper extension 41 and the lower extension 42 are arranged in parts of the front side member extension 4 on upper and lower sides of the side member 2. An upper and lower pair of attachment brackets 6, 7 are provided in such a manner as to be spaced apart in the vehicle vertical direction, in the upper extension 41 and the lower extension 42. Both right and left end parts of the bumper member 3 are attached to a lower part of the upper extension 41 and an upper part of the lower extension 42 through the upper and lower pair of attachment brackets 6, 7. Accordingly, the upper and lower pair of attachment brackets 6, 7 have L-shaped cross sections including vertical pieces 6a, 7a fixed to front faces of the upper extension 41 and the lower extension 42, and horizontal pieces 6b, 7b fixed to both rear ends of the middle part in the vehicle width direction of the bumper member 3.

In other words, in the vehicle front part 1 of the embodiment, the bumper member 3 is fixed to the upper extension 41 and the lower extension 42 of the front side member extension 4. Hence, the load of an offset crash and the like when the protrusion 5 comes into contact with the side member 2 is distributed to the front side member extension 4, through the bumper member 3.

Next, a description will be given of an operation of the vehicle front structure of the embodiment, at the time of an offset crash on the vehicle front part 1.

When an impact load is input into an end part on one side of the bumper member 3, and the projecting portion 31 at the end part of the bumper member 3 is pushed in toward the vehicle rear, the planar portion 52 on the vehicle inner side of the protrusion 5 provided on the inner side of the projecting portion 31 comes into contact with the side face part 2a on the vehicle outer side of the side member 2. With this, the impact load input to the end part on one side of the bumper member 3 is transmitted to the side member 2 through the protrusion 5, and is also distributed to the front side member extension 4. Hence, the end part of the bumper member 3 and the side member 2 do not bend into the vehicle compartment, but deform in a suppressed manner. Meanwhile, the protrusion 5 does not deform entirely, and only the contact point with the side member 2 and peripheral parts deform.

Note that at the time of a full overlap crash on the vehicle front part 1, the projecting portions 31 on both right and left ends of the bumper member 3 do not bend toward the vehicle rear. Moreover, since the gap c is formed between the planar portion 52 of the protrusion 5 and the side member 2, the middle part in the vehicle width direction of the bumper member 3 and the side member 2 deform while moving toward the vehicle rear, without bringing the planar portion 52 of the protrusion 5 into contact with the side face part 2a on the vehicle outer side of the side member 2.

Thus, the vehicle front structure of the embodiment of the present invention includes: the side member 2 that extends in the vehicle longitudinal direction in the vehicle front part 1, and is arranged in both side part of the vehicle; a bumper member 3 that extends in the vehicle width direction, and is linearly arranged at a vehicle frontmost end, a vehicle rear side of the bumper member 3 being joined to the side members 2; and the front side member extensions 4 that extend in the vehicle vertical direction, and are attached to tip end parts of the side members 2. The bumper member 3 has curving points P on the outer sides in the vehicle width direction, and the projecting portions 31 projecting outward in the vehicle width direction and extending obliquely toward the vehicle rear from the curving points P are provided on both ends in the vehicle width direction. Moreover, the protrusion 5 extending toward the side member 2 is arranged on the inner side in the vehicle width direction of the projecting portion 31, the tip end part 5b on the vehicle inner side of the protrusion 5 has the planar portion 52 opposite to the side face part 2a on the vehicle outer side of the side member 2, and the planar portion 52 of the protrusion 5 and the front side member extension 4 overlap in the vehicle longitudinal direction.

Hence, in the vehicle front structure of the present invention, at the time of an offset crash which is a mode in which an end part on one side of the vehicle front part 1 crashes, and the projecting portion 31 of the bumper member 3 on the crashed side bends toward the vehicle rear, the protrusion 5 moves toward the side member 2 side along with deformation of the bumper member 3, and the planar portion 52 comes into contact with the side face part 2a on the vehicle outer side of the side member 2. Accordingly, in the structure of the present invention, the protrusion 5 is interposed between the projecting portion 31 of the bumper member 3 and the side face part 2a of the side member 2 as a support, and can suppress bending of the bumper member 3, for example. Also, by suppressing deformation of the bumper member 3, deformation of the side member 2 toward the vehicle compartment can be prevented, and damage can be reduced. Moreover, in the vehicle front structure of the present invention, the front side member extension 4 is provided in the side member 2 so as to correspond to the planar portion 52 of the protrusion 5, whereby the side member is reinforced by the front side member extension 4. Hence, when the protrusion 5 comes into contact with the side member 2, excessive deformation of the side member 2 toward the vehicle inner side can be prevented, and since the protrusion 5 is allowed to fully exert its function, the ability of reducing crash damage can be enhanced even more.

In the vehicle front structure of the embodiment, the curving point P of the bumper member 3 is positioned on the vehicle outer side than the joining portion 32 with the side member 2. Hence, the length of the bumper member 3 in the vehicle longitudinal direction can be reduced, and the vehicle can be reduced in size. Furthermore, in the structure of the embodiment, at the time of a crash on the vehicle front part 1, deformation of the bumper member 3 at the curving point P by the side member 2 is less likely to be hindered. Hence, impact load can be absorbed more effectively.

Moreover, in the vehicle front structure of the embodiment, the protrusion 5 is formed into a shape such that the rear end part 51a of the arrangement portion 51 on the projecting portion 31 overlaps with the planar portion 52 of the protrusion 5 in the vehicle longitudinal direction. Accordingly, the rear end part 51a of the arrangement portion 51 falls within an area in a vehicle longitudinal direction of the planar portion 52 in side view of the vehicle. Hence, even at the time of an offset crash when the projecting portions 31 on end parts of the bumper member 3 receive a load in a bending manner, and the load is applied in a vehicle inner horizontal direction, the planar portion 52 of the protrusion 5 can receive the horizontal load, whereby deformation of the bumper member 3 including the projecting portion 31 can be prevented securely.

In the vehicle front structure of the embodiment, the curved portion 53 curving toward the vehicle rear is provided in the inner face 5c on the vehicle front side of the protrusion 5. Hence, the area of the planar portion 52 of the protrusion 5 can be widened, and even if the protrusion 5 is designed to be compact, a sufficient contact area of the planar portion 52 on the side face part 2a of the side member 2 can be ensured. This can suppress deformation of the bumper member 3, and allow the protrusion 5 to stably exert its function.

In the vehicle front structure of the embodiment, the outer face 5d on the vehicle rear side of the protrusion 5 is formed into a linear plane tilted to the vehicle rear side, from the rear end part 51a of the arrangement portion 51 on the projecting portion 31 toward the planar portion 52 of the protrusion 5. Hence, the strength of the protrusion 5 against load from an oblique front direction by an offset crash can be increased, and the protrusion 5 can suppress deformation of the projecting portion 31 of the bumper member 3 more effectively.

Moreover, in the vehicle front structure of the embodiment, the outer face of the lower extension 42 configuring the front side member extension 4 and the side face part 2b on the vehicle inner side of the side member 2 are disposed in a mutually abutting manner Hence, the side member 2 is less likely to be deformed by a crash than in a conventional structure, and bending of the bumper member 3 can be reliably suppressed.

In the vehicle front structure of the embodiment, the upper and lower pair of attachment brackets 6, 7 are provided in such a manner as to be spaced apart in the vehicle vertical direction, in parts of the front side member extension 4 on upper and lower sides of the side member 2. Both right and left end parts of the bumper member 3 are attached to the front side member extension 4, through the upper and lower pair of attachment brackets 6, 7. Hence, load applied when the protrusion 4 comes into contact with the side member 2 can be distributed to the front side member extension 4 through the bumper member 3, whereby deformation of the side member 2 can be suppressed, and deformation into the vehicle compartment can be suppressed effectively.

Although the embodiment of the present invention has been described, the invention is not limited to the above embodiment, and various modifications and changes can be made based on the technical concept of the invention.

For example, although the protrusion 5 of the above embodiment is formed into a box structure, it may have a U-shaped cross section with an open lower side. Also, the protrusion 5 does not necessarily have to be hollow, and a honeycomb structure or the like for enhancing stiffness may fill the inside of the protrusion.

REFERENCE SIGNS LIST 1 vehicle front part
2 side member
2a side face part on vehicle outer side
2b side face part on vehicle inner side
3 bumper member
4 front side member extension
5 protrusion
5a base end part
5b tip end part
5c inner face
5d outer face
6, 7 attachment bracket
21 joining portion
31 projecting portion
32 joining portion
41 upper extension
42 lower extension
51 arrangement portion
51a rear end part
52 planar portion
53 curved portion
c gap
P curving point
S space

The invention claimed is:
1. A vehicle front structure comprising:
a side member extending in a vehicle longitudinal direction, and arranged on a side of a vehicle;
a bumper member extending in a vehicle width direction and arranged linearly at a vehicle frontmost end, a rear side of the bumper member being joined to the side member; and
a front side member extension extending in a vehicle vertical direction, and attached to a tip end part of the side member,
the bumper member having a curving point on an outer side in a vehicle width direction, and a projecting portion projecting outward in the vehicle width direction and obliquely extending toward a vehicle rear from the curving point being provided at an end in the vehicle width direction of the bumper member, wherein:
- a protrusion extending toward the side member is arranged on an inner side in the vehicle width direction of the projecting portion, a planar portion opposite to a side face part on a vehicle outer side of the side member being provided on a tip end part on a vehicle inner side of the protrusion; and
- the planar portion of the protrusion and the front side member extension are arranged in such a manner as to overlap in the vehicle longitudinal direction.

2. The vehicle front structure according to claim 1, wherein the curving point of the bumper member is positioned on a vehicle outer side of a joining portion with the side member.

3. The vehicle front structure according to claim 1, wherein the protrusion is formed into a shape such that a rear end part of an arrangement portion on the projecting portion overlaps with the planar portion of the protrusion in the vehicle longitudinal direction.

4. The vehicle front structure according to claim 1, wherein a curved portion curving toward the vehicle rear is provided on a face on a vehicle front side of the protrusion.

5. The vehicle front structure according to claim 1, wherein an outer face on a vehicle rear side of the protrusion is formed into a linear plane tilted to the vehicle rear side, from the rear end part of the arrangement portion on the projecting portion toward the planar portion of the protrusion.

6. The vehicle front structure according to claim 1, wherein an outer face of the front side member extension and a side face part on a vehicle inner side of the side member are disposed in a mutually abutting manner.

7. The vehicle front structure according to claim 1, wherein an upper and lower pair of attachment brackets are provided in such a manner as to be spaced apart in the vehicle vertical direction, in parts of the front side member extension positioned on upper and lower sides of the side member, the bumper member being attached to the front side member extension through the upper and lower pair of attachment brackets.

* * * * *